US011031583B2

(12) United States Patent
Waechter et al.

(10) Patent No.: US 11,031,583 B2
(45) Date of Patent: Jun. 8, 2021

(54) COATING AND LITHIATION OF INORGANIC OXIDANTS BY REACTION WITH LITHIATED REDUCTANTS

(71) Applicant: BELENOS CLEAN POWER HOLDING AG, Bienne (CH)

(72) Inventors: Florian Waechter, Zurich (CH); Reinhard Nesper, Amden (CH)

(73) Assignee: BELENOS CLEAN POWER HOLDING AG, Bienne (CH)

( * ) Notice: Subject to any disclaimer, the term of this patent is extended or adjusted under 35 U.S.C. 154(b) by 214 days.

(21) Appl. No.: 15/848,745

(22) Filed: Dec. 20, 2017

(65) Prior Publication Data

US 2018/0111108 A1  Apr. 26, 2018

Related U.S. Application Data

(62) Division of application No. 14/741,641, filed on Jun. 17, 2015, now abandoned, which is a division of application No. 13/724,748, filed on Dec. 21, 2012, now Pat. No. 9,099,716.

(30) Foreign Application Priority Data

Dec. 22, 2011 (EP) ..................... 11195377
Feb. 29, 2012 (EP) ..................... 12157429

(51) Int. Cl.

| | | |
|---|---|---|
| *H01M 4/13* | (2010.01) | |
| *H01M 4/1391* | (2010.01) | |
| *B02C 17/00* | (2006.01) | |
| *H01M 4/131* | (2010.01) | |
| *H01M 4/136* | (2010.01) | |
| *H01M 4/139* | (2010.01) | |
| *H01M 4/36* | (2006.01) | |
| *B01J 19/10* | (2006.01) | |
| *B01J 19/12* | (2006.01) | |
| *H01M 4/04* | (2006.01) | |
| *H01M 4/134* | (2010.01) | |
| *H01M 4/38* | (2006.01) | |
| *H01M 4/485* | (2010.01) | |
| *H01M 4/58* | (2010.01) | |
| *H01M 4/1395* | (2010.01) | |
| *H01M 4/1393* | (2010.01) | |

(52) U.S. Cl.
CPC ............. *H01M 4/13* (2013.01); *B01J 19/10* (2013.01); *B01J 19/126* (2013.01); *B02C 17/00* (2013.01); *H01M 4/049* (2013.01); *H01M 4/0416* (2013.01); *H01M 4/131* (2013.01); *H01M 4/134* (2013.01); *H01M 4/136* (2013.01); *H01M 4/139* (2013.01); *H01M 4/1391* (2013.01); *H01M 4/366* (2013.01); *H01M 4/381* (2013.01); *H01M 4/382* (2013.01); *H01M 4/485* (2013.01); *H01M 4/5825* (2013.01); *H01M 4/1393* (2013.01); *H01M 4/1395* (2013.01); *Y02E 60/10* (2013.01); *Y02P 70/50* (2015.11); *Y10T 29/49115* (2015.01)

(58) Field of Classification Search
CPC .... H01M 4/0416; H01M 4/049; H01M 4/485; H01M 4/131; H01M 4/136; H01M 4/139; H01M 4/366; H01M 4/13; H01M 4/1391; H01M 4/134; H01M 4/1393; H01M 4/1395; H01M 4/381; H01M 4/382; H01M 4/5825; B01J 19/10; B01J 19/126; B02C 17/00
See application file for complete search history.

(56) References Cited

U.S. PATENT DOCUMENTS

| | | |
|---|---|---|
| 6,962,666 B2 | 11/2005 | Ravet et al. |
| 2002/0195591 A1 | 12/2002 | Ravet et al. |
| 2003/0073001 A1 | 4/2003 | Barker et al. |
| 2004/0140458 A1 | 7/2004 | Ravet et al. |
| 2006/0060827 A1 | 3/2006 | Ravet et al. |
| 2008/0257721 A1 | 10/2008 | Ravet et al. |
| 2009/0155689 A1 | 6/2009 | Zaghib et al. |
| 2010/0301267 A1 | 12/2010 | Mao et al. |
| 2011/0086273 A1 | 4/2011 | Ravet et al. |

(Continued)

FOREIGN PATENT DOCUMENTS

| | | |
|---|---|---|
| CN | 1848485 A | 10/2006 |
| EP | 2 098 483 A1 | 9/2009 |

(Continued)

OTHER PUBLICATIONS

EPO website (www.espacenet.com) machine translation of the detailed description of JP 09-330720A. (Year: 1997).*

(Continued)

*Primary Examiner* — Gregg Cantelmo
(74) *Attorney, Agent, or Firm* — Oblon, McClelland, Maier & Neustadt, L.L.P.

(57) ABSTRACT

A method for producing conductive carbon coated particles of an at least partially lithiated electroactive core material comprises the step of premixing an oxidant electroactive material with a metallated reductant followed by chemically reacting the oxidant electroactive material with the metallated reductant, said reductant being a coating precursor, said metal being at least one alkaline and/or at least one alkaline earth metal, and said chemically reacting being performed under conditions allowing reduction and metallation of the electroactive material via insertion/intercalation of the alkaline metal cation(s) and/or the alkaline earth metal cation(s) and coating formation via a polymerisation reaction like polyanionic or radicalic polymerisation of the reductant.

18 Claims, 9 Drawing Sheets

(56) References Cited

U.S. PATENT DOCUMENTS

| | | |
|---|---|---|
| 2011/0097479 A1 | 4/2011 | Ravet et al. |
| 2011/0104553 A1 | 5/2011 | Pol et al. |
| 2011/0104576 A1 | 5/2011 | Johnson et al. |

FOREIGN PATENT DOCUMENTS

| | | | |
|---|---|---|---|
| JP | 09330720 A | * | 12/1997 |
| JP | 2006318815 A | * | 11/2006 |

OTHER PUBLICATIONS

EPO website (www.espacenet.com) machine translation of the detailed description of JP 2006-318815A. (Year: 2006).*
T.J. Patey, et al., "Flame co-synthesis of $LiMn_2O_4$ and carbon nanocomposites for high power batteries", Journal of Power Sources, Elsevier, vol. 189, No. 1, XP025982679, Apr. 1, 2009, pp. 149-154.
Reinhard Nesper, et al., "Synthesis and Characterization of Carbon-Based Nanoparticles and Highly Magnetic Nanoparticles with Carbon Coatings", Advanced Functional Materials, vol. 16, No. 2, XP55035825, Jan. 19, 2006, pp. 296-305.
European Search Report dated Aug. 20, 2012, in European Patent Application No. 12157429.7, filed Feb. 29, 2012.
Zhang et al.—"Synthesis and Characterization of Macroporous $Li_3V_2(PO_4)_3$/C Composites as Cathode Materials for Li-ion Batteries", Springer-Verlag, Jun. 18, 2011, pp. 937-944.

* cited by examiner

COATING AND LITHIATION OF INORGANIC OXIDANTS BY REACTION WITH LITHIATED REDUCTANTS

This application is a divisional of U.S. application Ser. No. 14/741,641 filed Jun. 17, 2015, which is now abandoned and which was a divisional of U.S. application Ser. No. 13/724,748 filed Dec. 21, 2012, which is now U.S. Pat. No. 9,099,716 and which claims priority from European Patent Application No. 11195377.4 filed Dec. 22, 2011 and European Patent Application No. 12157429.7 filed Feb. 29, 2012. Thus, this application claims priority from European Patent Application No. 11195377.4 filed Dec. 22, 2011 and European Patent Application No. 12157429.7 filed Feb. 29, 2012, the entire disclosure of which is incorporated herein by reference.

TECHNICAL FIELD

The present invention concerns conductive microparticles suitable for being used in electrodes of lithium ion batteries as well as methods for the production of such microparticles and electrodes.

BACKGROUND ART

The electroactive materials of electrodes of lithium ion batteries comprise at least one transition metal providing exchangeable valence electrons, said material also allowing insertion and removal or intercalation and deintercalation, respectively, of alkaline metal ions in order to keep neutrality of the material in case of exchange of valence electrons.

Some very interesting electroactive materials are not or not sufficiently conductive per se. Such materials are used in the form of microparticles (also termed microparticulate form) or nanoparticles (also termed nanoparticulate form) and in combination with a conductive matrix. Additional improvement is obtained if the particles are conductively coated.

It is assumed that conductive coatings add to the structural integrity of the particles because of improved regularity of electric field distribution on the surface of the particles and therewith connected improved structural integrity. In addition, even if the electroactive material particles are partially disintegrated over an extended number of cycles, the carbon coating proved advantageous. This may be due to encapsulation of the disintegrated particles and—if breaking apart—in partially conductively coated fragments. Methods for providing microparticles with a conductive coating are known. The preferred coating is a coating with carbonaceous material.

Carbon and carbonaceous materials are known as good electrical conductors and are already used to increase the electronic conductivity of electroactive materials. In general, carbon coating of oxide materials is carried out using a pyrolysis process that forms a thin layer of carbonaceous material such as pyrolitic graphite on the surface of particles provided that the electroactive core material is sufficiently stable in reducing atmosphere (see U.S. Pat. No. 6,962,666). According to U.S. Pat. No. 6,962,666, the carbonaceous coating may be obtained through thermal decomposition or through dehydrogenation, e.g. by partial oxidation of organic materials such as hydrocarbons and their derivatives like polycyclic aromatic moieties, sugars, carbon hydride and polymers. In some embodiments a lithium salt of carboxylic acids is used for simultaneous lithiation and pyrolytic carbonatious coating formation.

However, the problem with the coatings of the state of the art is that the pyrolysis reaction is not well defined. During pyrolysis, the hydrocarbon or carboxylic acid deposits may release compounds in different stats of oxidation/reduction like hydrogen or water and carbon oxides or dioxides resulting in an inhomogeneous coating of not clearly defined composition and possibly in affected EAMs.

Thus, there is still a need for high energy storage materials with a good conductive coating and a method for obtaining such materials preferably in a one step reaction.

DISCLOSURE OF THE INVENTION

Hence, it is a general object of the invention to provide optimized coating methods and therewith obtainable optimized carbon coated electroactive particles with a coating having improved homogeneity and purity.

Now, in order to implement these and still further objects of the invention, which will become more readily apparent as the description proceeds, the method for producing conductively coated particles comprising an at least partially metallated electroactive core material is manifested by comprising the steps of premixing an oxidant electroactive material with a metallated reductant followed by chemically reacting the oxidant electroactive material with the metallated reductant, said reductant being a coating precursor, said metal being at least one alkaline and/or at least one alkaline earth metal, and said chemically reacting being performed under conditions allowing reduction and metallation of the electroactive material via insertion/intercalation of the alkaline metal cation(s) and/or the alkaline earth metal cation(s) and coating formation via a polymerisation reaction, like polyanionic or radicalic polymerisation, of the reductant.

The terms insertion and intercalation or deinsertion and deintercalation, respectively are used interchangeably for both crystalline and amorphous materials.

A metal comprising compound is termed metallated.

Insertion or intercalation, respectively, of different alkaline and/or alkaline earth metals at the same time like Li and Na and/or K can lead to a more stable system. Thus the use of mixed metallated reductants like $Li_{2-x}Na_xC_2$ ($x \leq 1$) and/or $Li_{2-x}K_xC_2$ ($x \leq 1$) is also of interest.

In one embodiment, the metallated reductant comprises or consists of alkaline metal(s), wherein the alkaline metal(s) comprises at least 50% lithium, preferably at least 95% lithium, more preferred at least 99% lithium.

For sake of readability, in the following description lithium is mentioned although besides of lithium sodium and potassium may also be present, or alkaline earth metals alone or in combination with alkaline metals.

The method of the present invention is a one step method that allows simultaneous lithiation and coating of inorganic oxidants. The coating is not limited to carbon although carbon is preferred but may e.g. also be a boron nitride or a carbon nitride coating. Other possible coatings comprise $CB_x$ from $B=C=B^{4-}$ compounds like $Li_4CB_2$, $CB_xN_y$ from a lithium pyrazine precursor like $Ca_{10-x}Li_{2x}(BN_2)_4(CBN)_2$ (see also WO 2004/069768), $(S_yN)_x$ from e.g. $Li_gNS_3$, $(CH)_x$ (polyacetylene) for example form $LiHC_2$.

The conditions allowing reduction and lithiation comprise applying energy in the form of
    heat
    tribological energy like (ball) milling
    ultrasound
    microwave.

In preferred embodiments, the chemical reaction can be induced either via thermal treatment of via tribological treatment, e.g. by ball milling.

Both methods lead to conductively coated particles comprising an at least partially lithiated electroactive core material, but to different core materials. While heat treatment produces a crystalline at least partially lithiated electroactive core material, ball milling results in an almost amorphous at least partially lithiated electroactive core material. This difference in the at least partially lithiated electroactive core material, i.e. whether it is crystalline or amorphous, has a strong influence on the electrochemical behavior.

The reaction is a redox reaction of the form

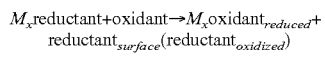
$$M_x\text{reductant}+\text{oxidant} \rightarrow M_x\text{oxidant}_{reduced}+ \\ \text{reductant}_{surface}(\text{reductant}_{oxidized})$$

In the following description, the electroactive material or electroactive core material or oxidant is abbreviated as EAM and the at least partially lithiated electroactive core material as LiEAM.

Different to pyrolysis, the carbon coating takes place via a stoichiometric reaction according to the equation 1:

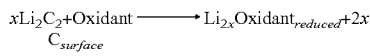
$$x\text{Li}_2\text{C}_2+\text{Oxidant} \longrightarrow \text{Li}_{2x}\text{Oxidant}_{reduced}+2x\,\text{C}_{surface}$$

Boron nitride coating and lithiation of formally inorganic oxidants may be obtained by reaction with $Li_3BN_2$ according to the following equation 2:

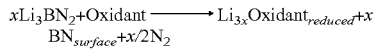
$$x\text{Li}_3\text{BN}_2+\text{Oxidant} \longrightarrow \text{Li}_{3x}\text{Oxidant}_{reduced}+x\,\text{BN}_{surface}+x/2\,\text{N}_2$$

Carbon nitride coating and lithiation of formally inorganic oxidants may be obtained by reaction with $Li_2CN_2$ according to the following equation 3:

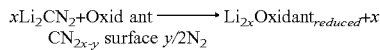
$$x\text{Li}_2\text{CN}_2+\text{Oxidant} \longrightarrow \text{Li}_{2x}\text{Oxidant}_{reduced}+x\,\text{CN}_{2x-y}\text{ surface } y/2\,\text{N}_2$$

Possible Oxidants are:

| | |
|---|---|
| Transition metal oxides | $MoO_3$, $MnO_2$, $LiMn_2O_4$, $V_2O_5$ |
| Hydrated transition metal oxides | $H_2V_3O_8$ |
| Transition metal oxynitrides | NbNO |
| Transition metal phosphates | $M_x(PO_4)_y$ (M = Fe, Co, Mn, Ni) |
| Transition metal oxides glasses | Glasses containing V2O5 and MoO3 |
| Elements | S; Se; Si |

The EAMs preferably are in the form of microparticles or even nanoparticles. Usually they have average diameters below 10 μm, preferably below 5 μm, more preferred below 1 μm and especially below 500 nm, in particular they are nanoparticles having an average particle size in the range of 5 to 500 nm, preferably in the range of 5 to 400 nm, more preferred in the range of 20 to 300 nm.

Also the lithium providing reductants are preferably of small size. For example lithium carbide ($Li_2C_2$) after synthesis has a particle size of 10 to 100 μm. Since an as small as possible particle size is assumed to improve homogeneity of the coating, it is reduced in size, e.g. by ball milling for 1 hour with 500 rpm, to end up with a homogeneous particle size of 1-5 μm.

Particle sizes of <10 μm, preferably 100 nm to 5 μm, more preferred 0.5 to 1.5 μm are generally preferred for all Li and coating providing reductants.

Although (as shown above) other than carbon coatings can be applied via the inventive methods, carbon is presently preferred due to its conductivity that is better than the one of CN and BN and because of the good availability of suitable metallated precursors.

The invention is now further described for a carbon coating. However, the respective information is also applicable to other coatings.

Due to the stoichiometry of the reactions, the thickness of the coating can only be varied by variation of the particle size of the EAM or—for thinner coatings—by starting from an EAM that has already been partially lithiated. For a carbon coating starting from $Li_2C_2$, the amount of surface carbon corresponds to the amount of lithium taken up by the EAM. Since big particles have a higher ratio between volume and surface, as a rule the coating will be much thicker for big particles. The minimal thickness of 2 nm so far was observed for a 40 nm particle of $LiFePO_4$ and a maximum thickness of 30 nm for a 5 μm large particle of $LiV_2O_5$. It was found that even the thick coating of 30 nm allows intercalation/deintercalation, although at somewhat lower speed than a thin coating. The minimal thickness of a coating is assumed to be below 1 nm but presumably above 0.5 nm because the product deposited is not graphene. In addition, it is also assumed that the coating is protecting the EAM and therewith enhancing the cycle stability. Thus, the average thickness of the coating is preferably between 0.5 to 30 nm, more preferred between 0.5 to 2 nm.

Theoretically, the ideal thickness of the carbon coating is just thick enough to
- prevent EAMs/LiEAMs from dissolving
- prevent additional solid electrolyte interphases (SEI) growth of interphases that are formed on e.g. the cathode due to catalytic redox reactions of the electrolyte
- install reasonable surface conductivity for Li-ions and electrons
- possibly even glue the particles together.

In any case, it was found that in most cases partial or complete intercalation of cathode materials during this process improves their electrochemical properties.

In view of the homogeneous coverage of the particles with the carbon, some migration of the carbon on the surface of the particles is assumed.

Irrespective of whether the reaction is performed by ball milling or heat treatment, the reactants preferably are carefully premixed, in order to ensure that the reaction is started with homogeneously mixed starting materials.

The whole reaction, also the premixing can and preferably is performed in the absence of any solvent thereby avoiding any solvent removal step.

In e.g. the ball milling procedure the reaction starts directly. Suitable reaction conditions for this tribochemical step are e.g. a rotation speed of 200-1500 rpm during 15 to 45 minutes, such as around 30 minutes or 30 minutes. Hitherto optimal products were obtained with 400 rpm during 30 minutes. Also important is the ratio between the weight of the balls and the weight of the sample which with the presently used equipment was found to be in the range from 6:1 to 4:1, preferably around 5:1 like 5.2:1 to 4.8:1.

With the exception of the weight ratio the material of the balls is irrelevant, provided that it is sufficiently hard. Examples of suitable materials are: Agate, a modification of silica, steal, $Cr_2O_3$, and $Al_2O_3$ Since the reaction is only slightly exothermic, no raise of the overall temperature is observed during ball milling such that the tribochemical reaction is devoid of a thermal treatment.

The ball milling method therefore is also applicable for heat sensitive materials as $H_2V_3O_8$ without risking decomposition.

The disadvantage of the ballmilling method is that the conditions are more difficult to adjust and that therefore it is more difficult to avoid side reactions (see below).

The ball milling method results in an amorphous material.

Heat treatment can be performed with fast heating rate of for example between 150 to 200 K/h like 180 K/h. In preferred embodiments, heat treatment is performed either with a slow heating rate or with high heating rate for an initial phase followed by a slow heating rate. A slow heating rate of e.g. between 50 to 70 K/h should be applied for about at least the last hour, i.e. starting at 50 to 70 K below the reaction temperature. A presently preferred heating rate is around 60 K/h starting at about 60 K before reaching the reaction temperature. The fast heating rate for example may be between 150 to 200 K/h such as 180 K/h.

The reaction temperature depends on the EAM and can easily be determined by thermogravimetry at a heating rate of e.g. 10 K/min.

The advantage of the heat treatment are the very precisely adjustable conditions so that side reactions can be avoided.

The heat treatment leads to crystalline coated LiEAMs.

Since $Li_2C_2$ is a strong reductant care has to be taken that an intercalation takes place and not a reduction. As already indicated above, undesired side reactions have to be avoided by careful control of the reaction conditions. Such an undesired side reaction is e.g. shown in equation 4:

$$2MnO_2 + Li_2C_2 \longrightarrow 2MnO + Li_2O_2 + C$$

From the coated particulate materials described herein electrodes can be prepared by mixing the coated LiEAM with an optionally electronically conducting binder, optionally in particulate form and optionally in the presence of conductive additives like conductive carbon. The binding of the particulate coated LiEAM can be performed in a solvent followed by drying.

Suitable binders are polyvinylidene fluoride (PVDF), poly(3,4-ethylenedioxythiophene) (PEDOT), 1-cyclohexyl-3-(2-morpholinoethyl)carbodiimide metho-p-toluenesulfonate or 1-cyclohexyl-3-(2-morpholinoethyl)carbodiimide methyl-p-toluenesulfonate (CMC), polytetrafluoroethylene (PTFE), fluoro polymer rubber (FKS), styrene-butadiene rubber (SBR), polyacrylnitrile (PAN), polyurethane, polyacrylic acid, polyamide, polyacrylate, and polyvinylether.

Suitable conductive carbons are SuperP® or Super P Li® Carbon (obtainable from TIMCAL) or nanofibers or nanotubes.

Suitable solvents are a mixture of aprotic polar and aprotic apolar solvents like THF/Toluene 4:1.

Dependent on the thermostability drying is preferably either performed at temperatures well above 100° C. like 180° C. under air, or at temperatures below 100° C. like 80° C. under vacuum.

Such electrodes can be used together with any suitable anode, and an electrolyte like $LiPF_6$ or $Li(C_2F_5)_3PF_3$ (e.g. 1M in ethylene carbonate:dimethyl carbonate 1:1 (w/w)).

The advantages of the new methods and the therewith produced coated LiEAM are the enhanced purity due to the specific reactants. In addition, most of the carbon coating methods are performed via pyrolysis under reducing conditions in order to avoid combustion instead of pyrolysis. Therefore, it is impossible to coat numerous cathode materials which are in a high oxidation state with these methods. A separate reduction/coating will reduce the oxidation state and therefore make the EAM unusable for cathodes.

In case of the one step method disclosed in U.S. Pat. No. 6,962,666 one advantage of the present method is also that due to the inventive reactions no pyrolysis takes place. Another advantage is the enhanced purity and reproducibility due to the use of metallated reductants.

In one embodiment these reductants may be free from oxygen and optionally free from oxygen and hydrogen which may result in better defined coatings and insertion/intercalation products.

The method of the invention is a surface contact reaction. Thus, due to the specific starting materials and reaction conditions according to the invention only the EAM is coated. Possible non-EAM side-products, e.g. impurities from EAM production, can be found during the coating reaction (e.g. optically due to having a colour different from black) and separated from the product if desired. Furthermore the atom economy of the reaction is 100% or at least close to 100%, i.e. no metal or surface coating atom is wasted during the reaction. Compared to a pyrolysis method the method of the invention is a very environment friendly reaction due to the lower energy consumption and the about 100% atom economy. Especially if oxygen free reductants are used, no waste management of the exhaust (CO, $NO_x$) is needed.

Another advantage of the method of the invention is that no solvent is needed in the inventive coating reaction although in some cases use of a solvent might be useful.

The methods of the present invention lead to a predictable conversion of the coating precursor to the desired coating and predictable Li ions insertion since the reactions are stoichiometric. The invention also provides reactions that can be performed at low temperature and therefore are also suitable for coating temperature sensitive EAMs.

Contrary thereto the pyrolysis reaction of carboxylic acid salts will, dependent on the conditions and a specific EAM, in general lead to different compounds and to less defined coatings.

A further advantage of the inventive methods is that they can be used to produce a variety of conductive non carbonaceous coatings.

BRIEF DESCRIPTION OF THE DRAWINGS

The invention will be better understood and objects other than those set forth above will become apparent when consideration is given to the following detailed description thereof. Such description makes reference to the annexed drawings, that show.

MODES FOR CARRYING OUT THE INVENTION

Figure 1:
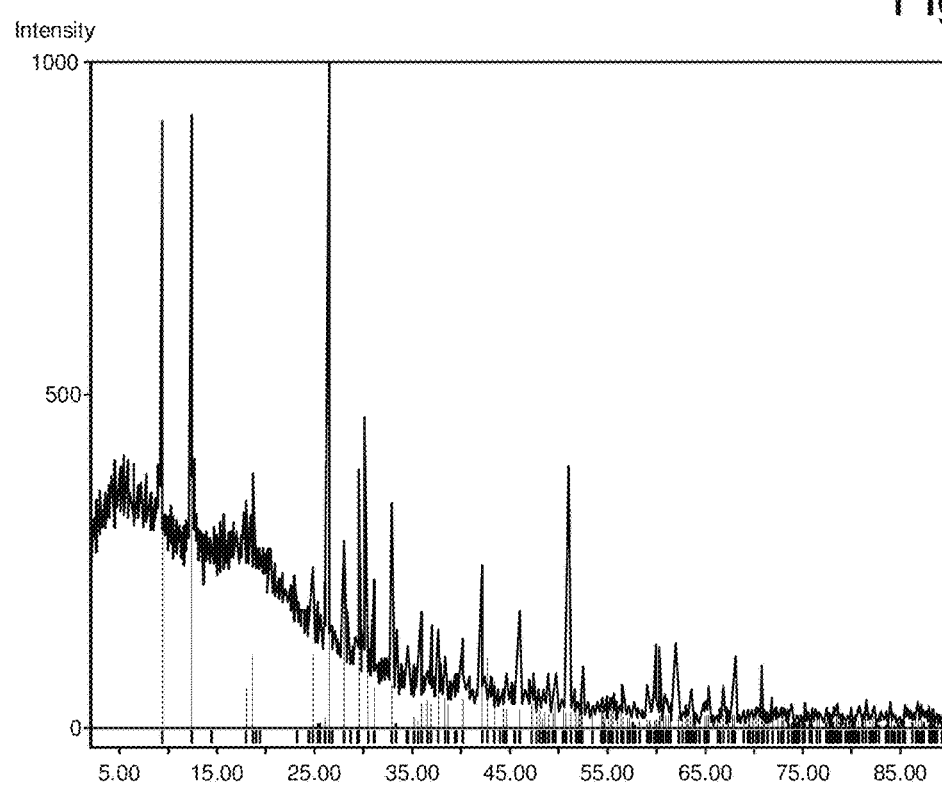
FIG. 1: X-Ray Powder Diffraction of the synthesized $Li_{0.3}V_2O_5$ compared to the theoretical pattern.
Figure 2:
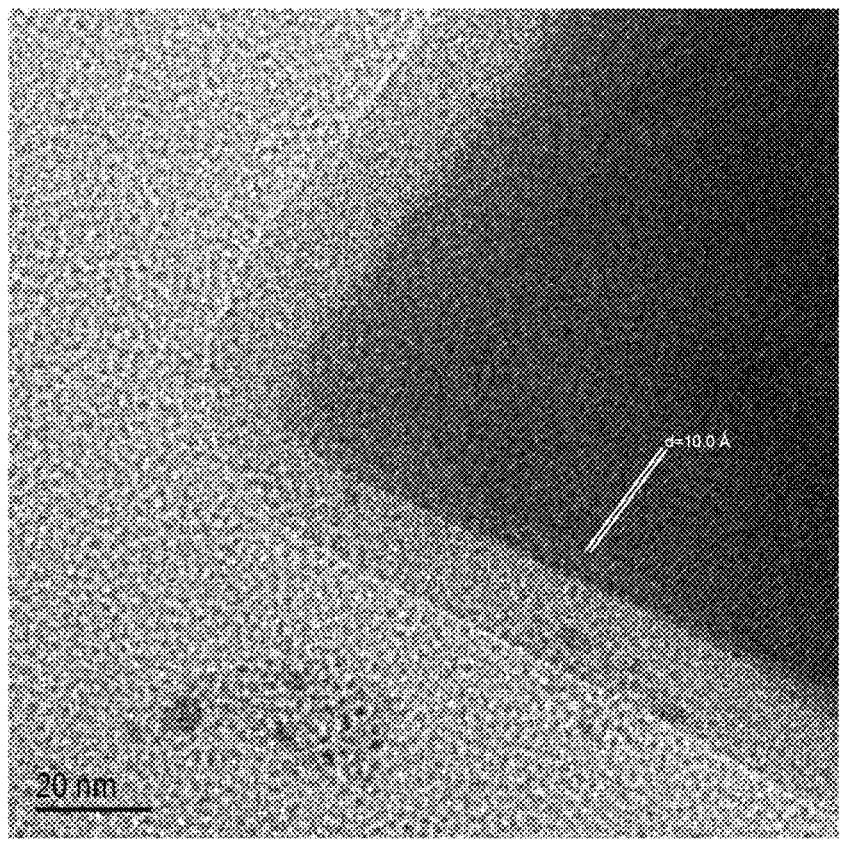
FIG. 2: TEM-picture of $Li_{0.3}V_2O_5$ with carbon coating. The inter plane distance corresponds to the a-lattice parameter of $Li_{0.3}V_2O_5$.
Figure 3:
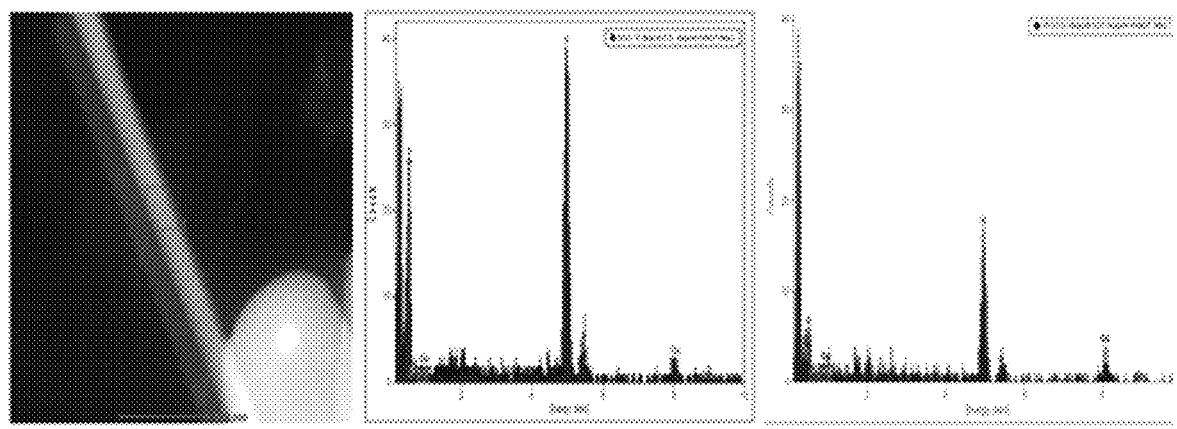
FIG. 3: EDX-analysis of $Li_{0.3}V_2O_5$ with carbon coating (EDX=Energy Dispersive X-ray Analysis).
Figure 4:
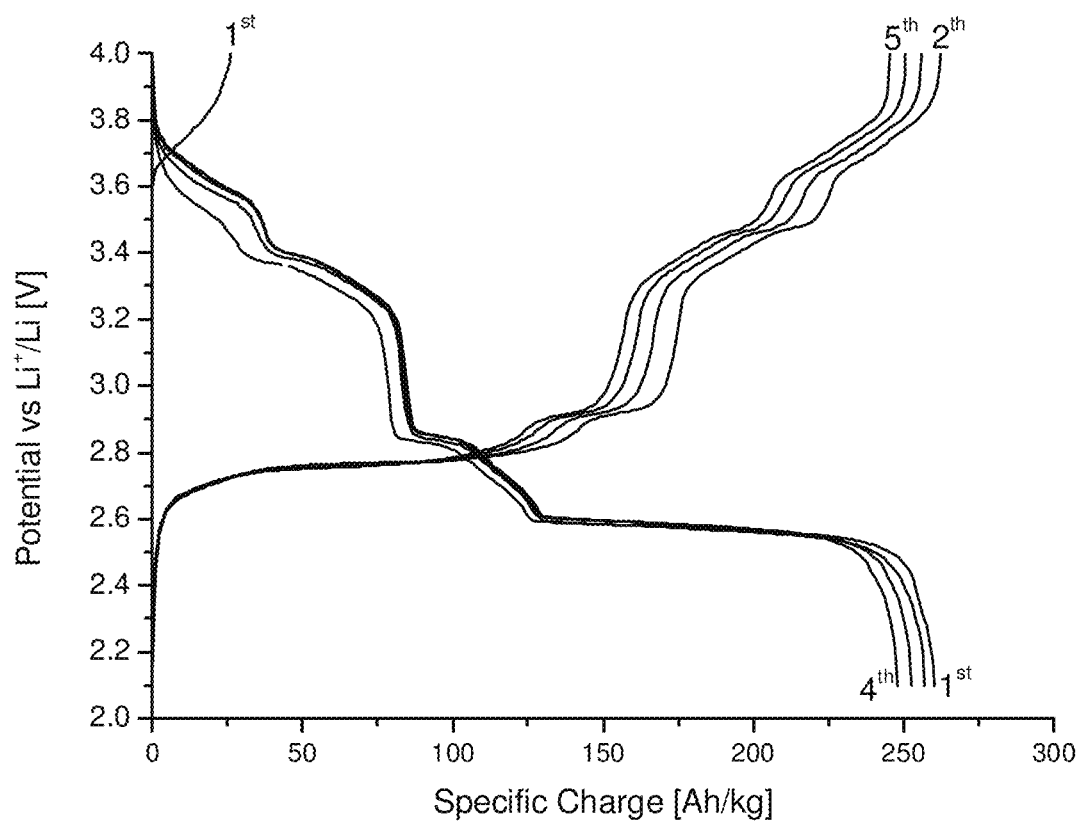
FIG. 4: Potential vs. specific charge for the $Li_{0.3}V_2O_5$ electrode.

Analytical and Investigation Methods:
Electrochemical Measurements:

Galvanostatic measurements were monitored by Astrol, a program from Astrol Electronic AG. A potentiostat (BAT-SMAL, battery cycler) was connected using a serial cable to a personal computer (running Windows XP) via a serial/analog converter. The composition of all electrodes was 73% active material, 15% Super P® Carbon (obtainable from TIMCAL) and 2% polyvinylidene fluoride (PVDF). The materials were mixed in a THF/Toluene 4:1 mixture. Finally the electrodes were dried at 180° C. under air. The only exception was the LiFePO$_4$ electrode that was dried at 80° C. under vacuum. The measurements were done with fixed currents of 50 A/kg.

The electrolyte was LP30 (obtainable from Merck Chemicals), 1.4 mol/L LiPF$_6$ in ethylene carbonate/dimethyl carbonate 1/1 by weight. and the counter electrode was a disk of metallic lithium with a diameter of 13 mm and 0.5 mm thickness.

Differential— and Thermogravimetry:

The measurements were performed with a Netzsch STA 409 using corundum crucibles using a heating rate of 10 K/min. The reference powder was corundum, too. The measurements show (see FIGS. 6 and 15) that there is no significant mass loss below the reaction temperature of 600° C. for V$_2$O$_5$ and 400° C. for MoO$_3$. Thus the reactions are completely proceeding to the lithiated oxidants$_{reduced}$ and carbon.

Powder Diffractometry:

The measurements were performed with a STOE STADI P2 diffractometer in transmission mode with germanium monochromator, CU$_{k\alpha1}$=1.54056 Å

Electron Microscopy:

Electron microscopy was performed in a Tecnai F30 microscope (manufactured by FEI) with a field emission gun (FEG), V$_{acc}$=300 kV, and C$_s$=1.2 mm Experimental Part:
Commercial Reactants and Electrolytes:
  Lithium granule 99.9%, Aldrich
  Graphite powder natural microcrystal grade, APS 2-15 micron, 99.9995%, Alfa Aesar
  V$_2$O$_5$, 99.2%, Alfa Aesar
  FeCl$_3$ anhydrous purum, Fluka
  H$_3$PO$_4$ ortho-phosphoric acid 85%, Merck
  MoO$_3$ 99.5%, Sigma Aldrich
  LiMn$_2$O$_4$, Merck
  PVDF averabe Mw~534,000 by GPC, Sigma Aldrich
  LP30; 1M LiPF6 in ethylene carbonate:dimethyl carbonate 1:1 (w/w), Merck
  LF30; 1M Li(C2F5)3PF3 in ethylene carbonate:dimethyl carbonate 1:1 (w/w), Merck, highly stable
Synthesized Materials [Source or Description of Method]:
Oxidants:
  FePO4 [C. Delacourt, Solid State Ionics, 173, 113-118, 2004]
  MnO2 [Asulab]
  NbNO [Nesper, R., Wang X.-J., EP 2 378 596 A1]
  Glasses of V2O5 and MoO3 [Sakurei et al. U.S. Pat. No. 4,675,260]
Metallated Reductants:
  Li$_2$C$_2$ [Armbruster, Dissertation (thesis), ETH Zurich No. 17553, 2008]
  LiNaC$_2$ [R. Nesper, *Habilitationsschrift*, Stuttgart, 1998]
  LiKC$_2$ [R. Nesper, *Habilitationsschrift*, Stuttgart, 1998]
  Li$_2$NCN [Sokolov, *Trudy po Khimi/Khimicheskoi Tekhnologii* (2), 18-19, 1973]
  Li$_3$BN$_2$ [Yamane, *Journal of Solid State Chemistry* 71(1), 1-11, 1987]
Heat Treatment:

EXAMPLE 1

FIGS. 1 to 4:

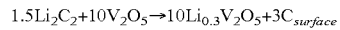

1.8 g (10 mmol) V$_2$O$_5$ and 0.0569 g (1.5 mmol) Li$_2$C$_2$ were mixed in a mortar. Then the mixture was heated to 600° C. using a heating ramp of 180° C./h and kept at 600° C. for 0.5 hours.

EXAMPLE 2

Figure 5:
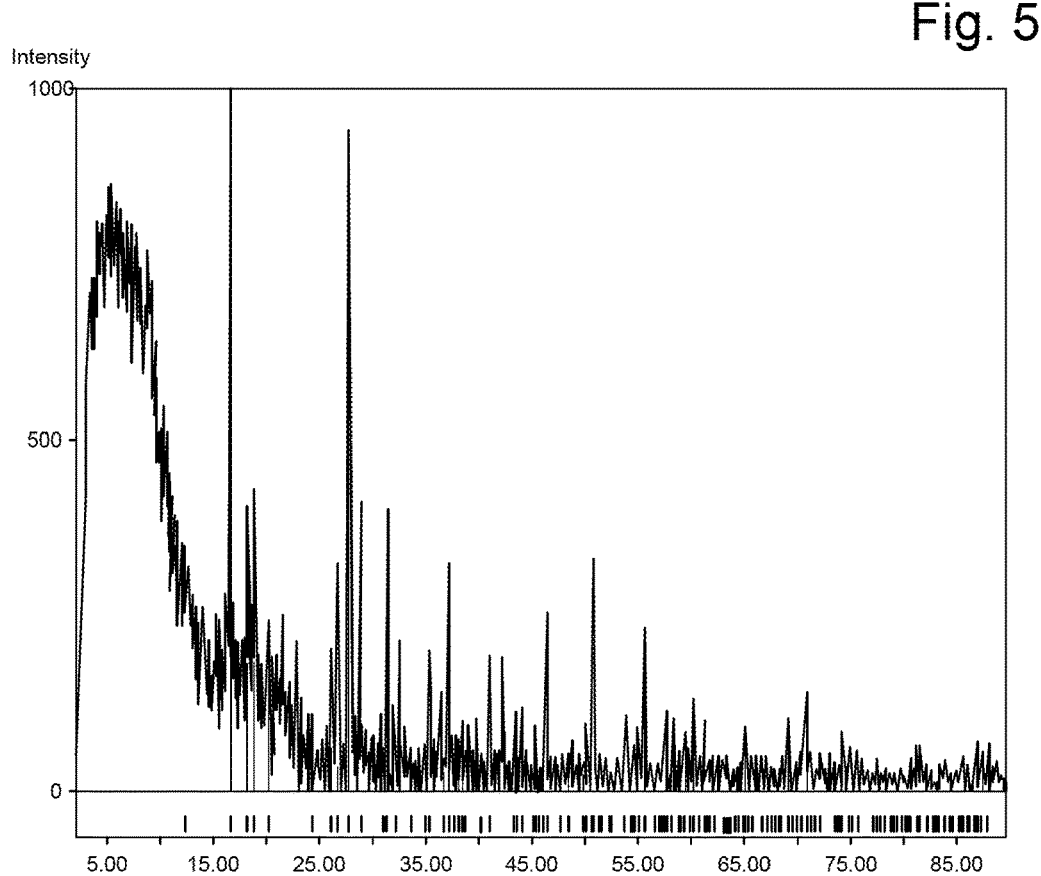
FIG. 5: X-Ray Powder Diffraction of the synthesized $LiV_2O_5$ compared to the theoretical pattern.
Figure 6:
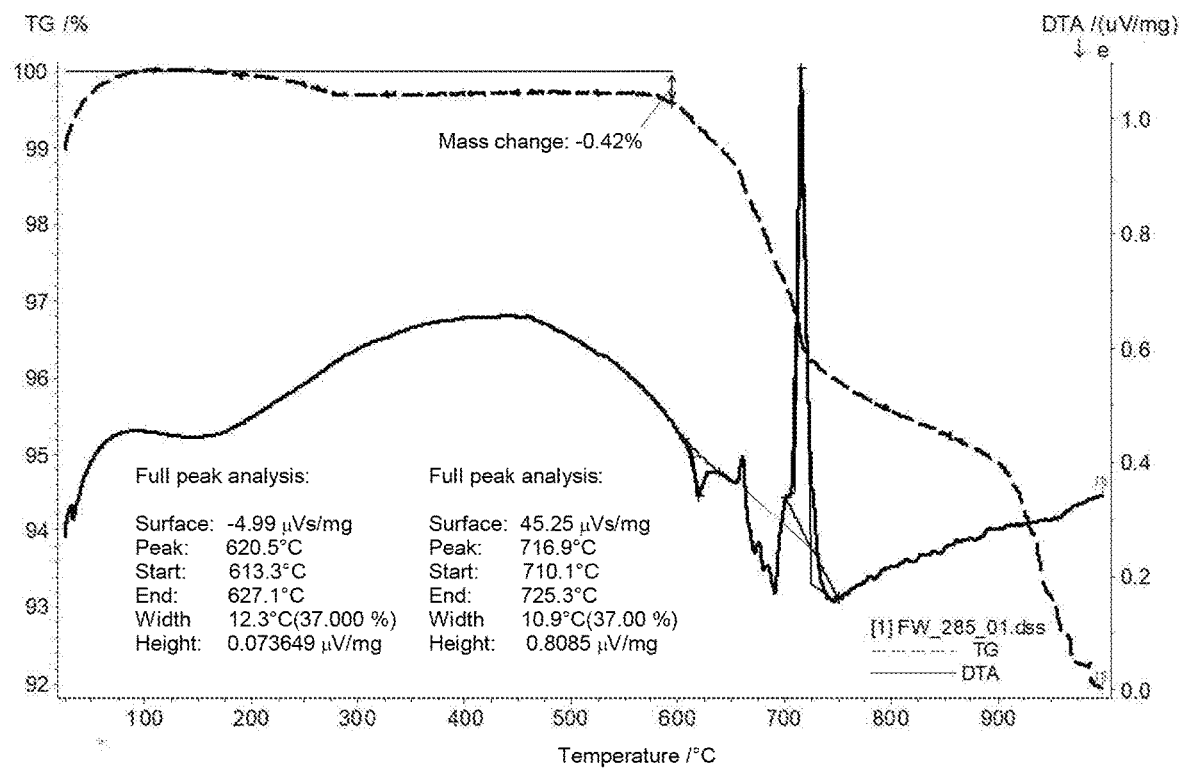
FIG. 6: Thermogravimetry of the reaction of $Li_2C_2$ with $V_2O_5$.
Figure 7:
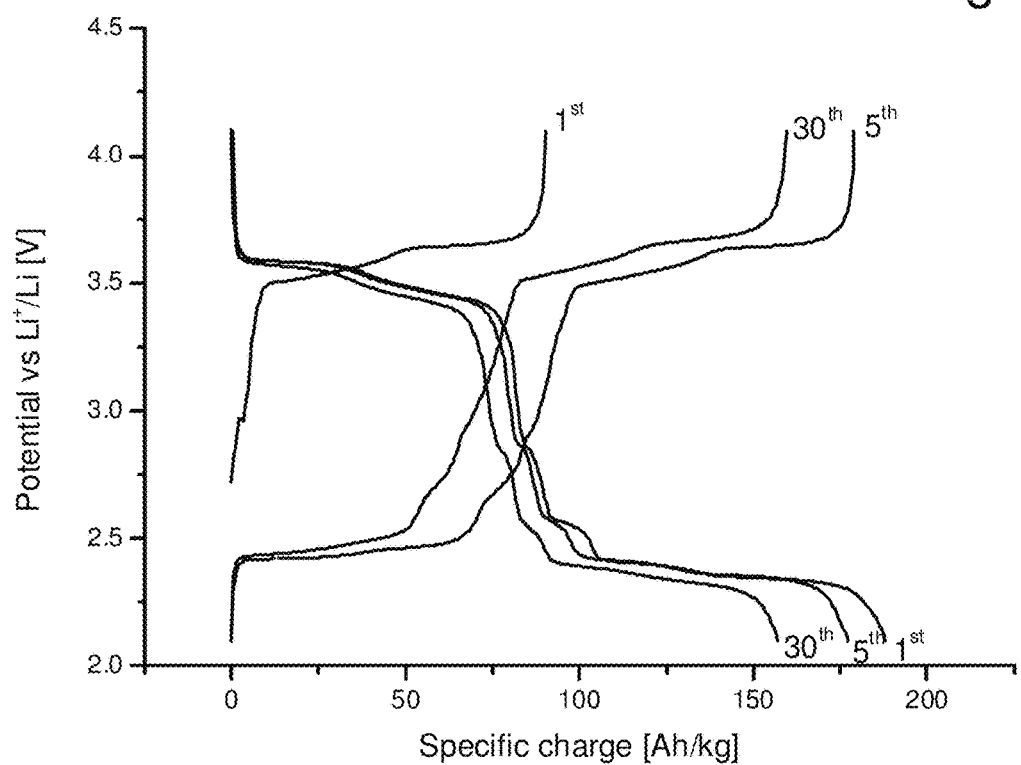
FIG. 7: Potential vs. specific charge for the $LiV_2O_5$ electrode.
Figure 8:
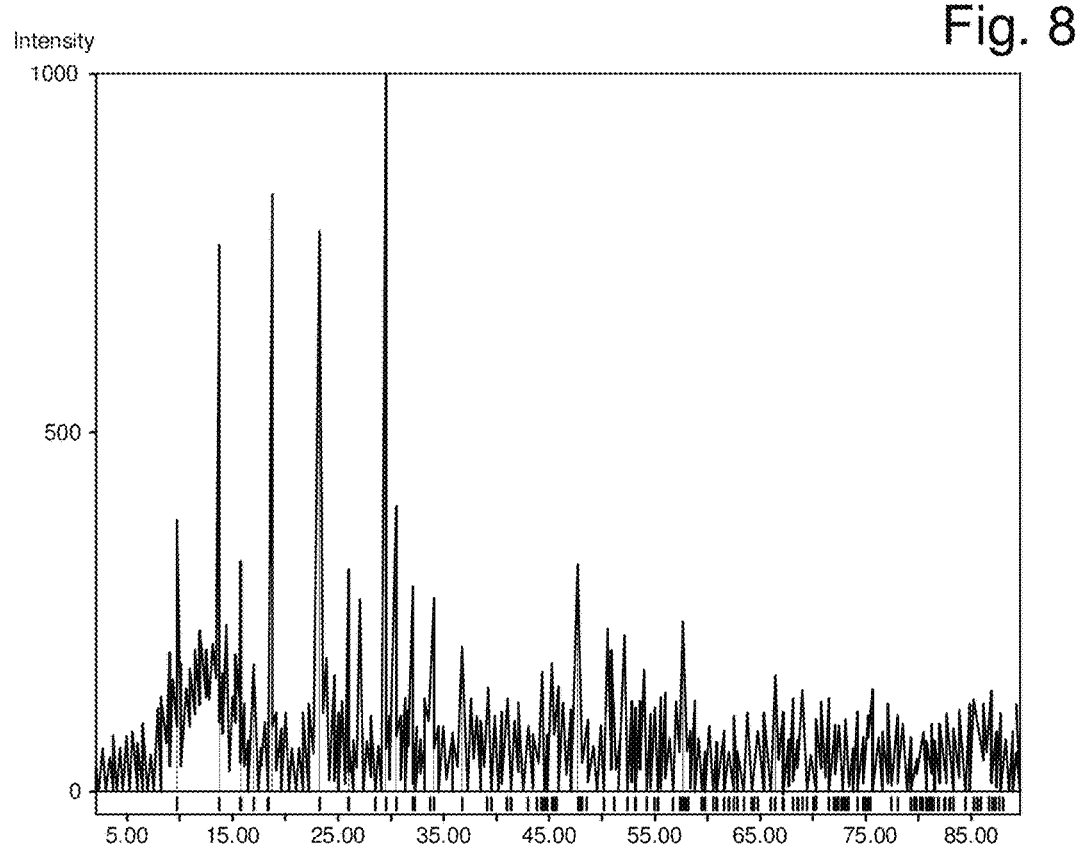
FIG. 8: X-Ray Powder Diffraction of $LiFePO_4$ synthesized via heat treatment (450° C.) compared to the theoretical pattern.
Figure 9:
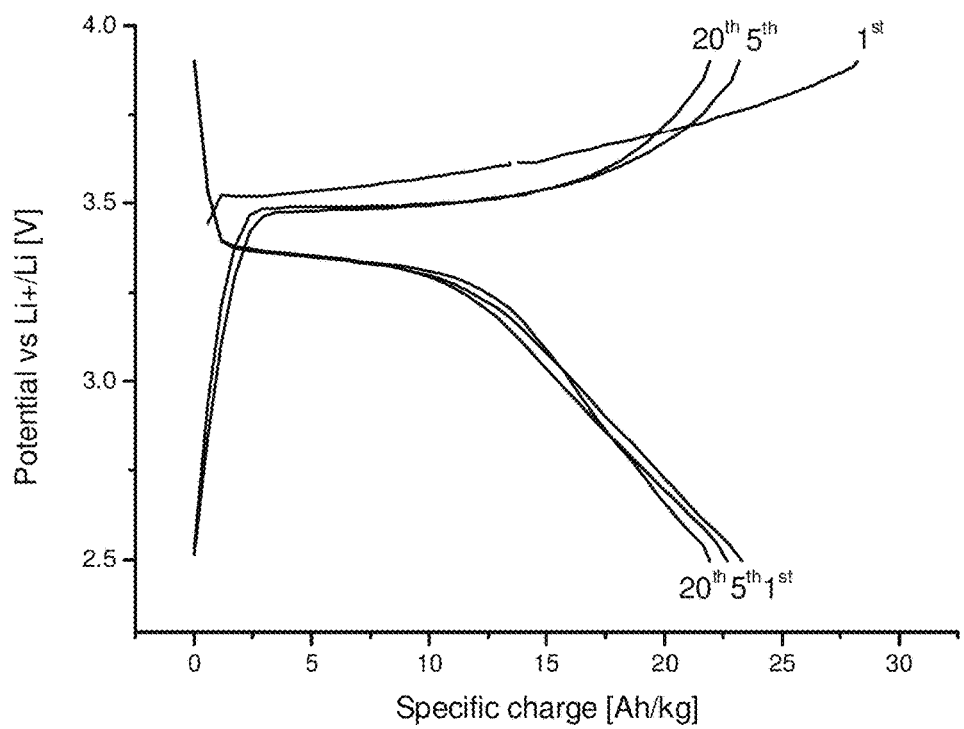
FIG. 9: Potential vs. specific charge for the via heat treatment synthesized $LiFePO_4$ electrode.
Figure 10:
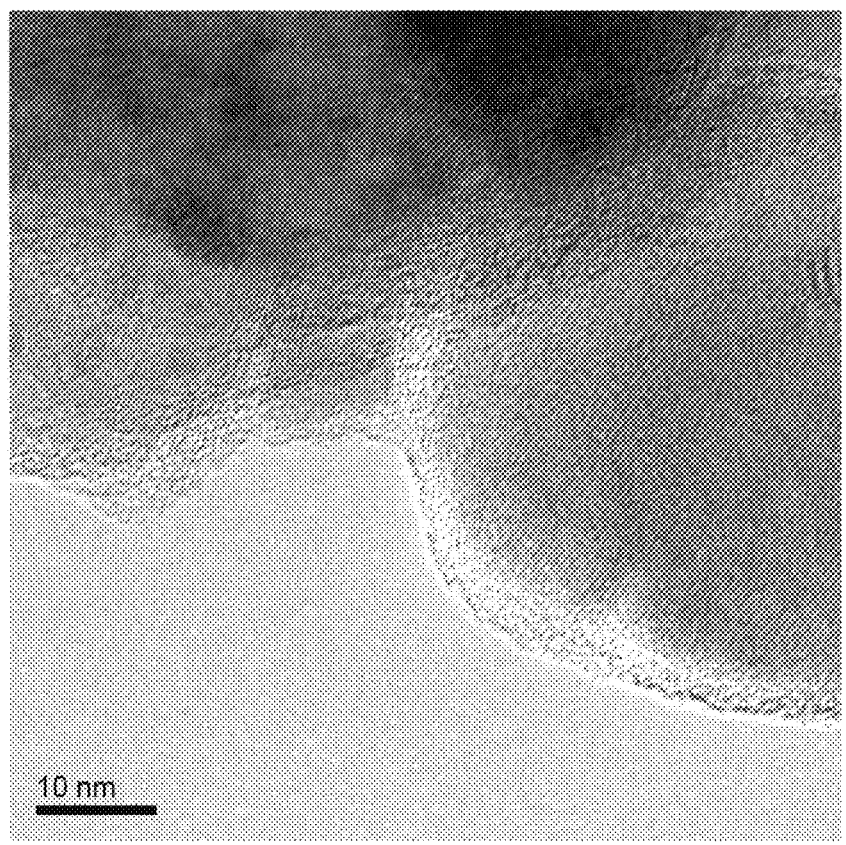
FIG. 10: TEM-bright field picture of LiFePO$_4$ with carbon coating.
Figure 11:
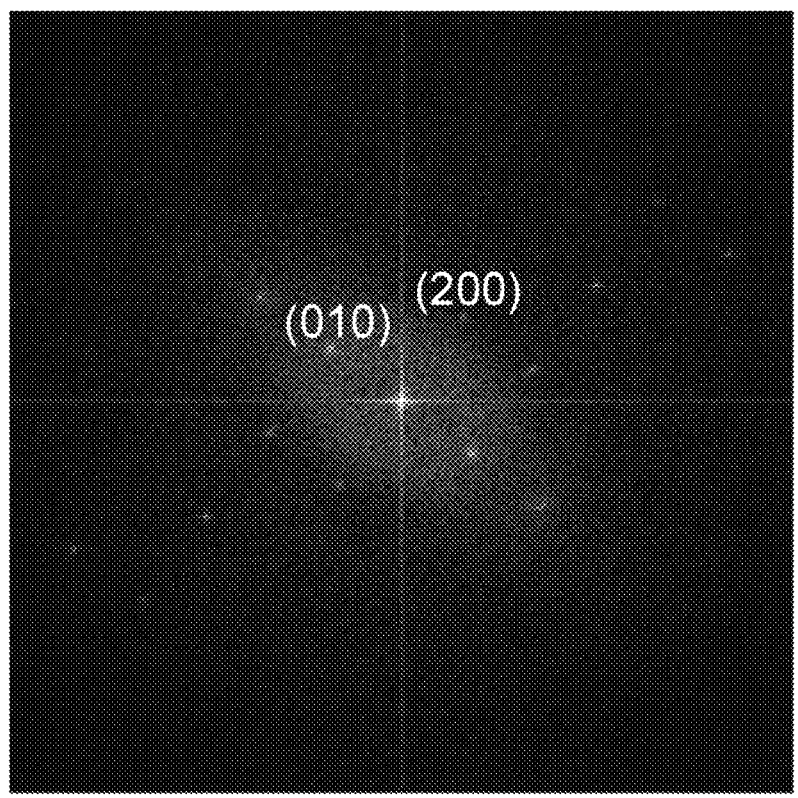
FIG. 11: Indexed Fourier Transformation of FIG. 9.

FIGS. 5 to 7:

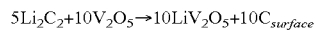

1.8 g (10 mmol) V$_2$O$_5$ and 0.1895 g (5 mmol) Li$_2$C$_2$ were mixed in a mortar. Then the mixture was heated to 600° C. using a heating ramp of 180° C./h and kept at 600° C. for 0.5 hours.

EXAMPLE 3

FIGS. 8 to 11:

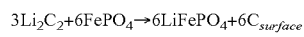

0.905 g (6 mmol) FePO$_4$ and 0.114 g (3 mmol) Li$_2$C$_2$ were mixed in a mortar. Then the mixture was heated to 450° C. using a heating ramp of 180° C./h and kept at 450° C. for 2 hours.

Ball Milling:

The starting materials indicated below were premixed in a mortar before reacted in a Fritsch Pulverisette 6 with 400 rpm for 0.5 hours and at a ratio between the weight of the balls and the weight of the sample of 1:5.

EXAMPLE 4

Figure 12:
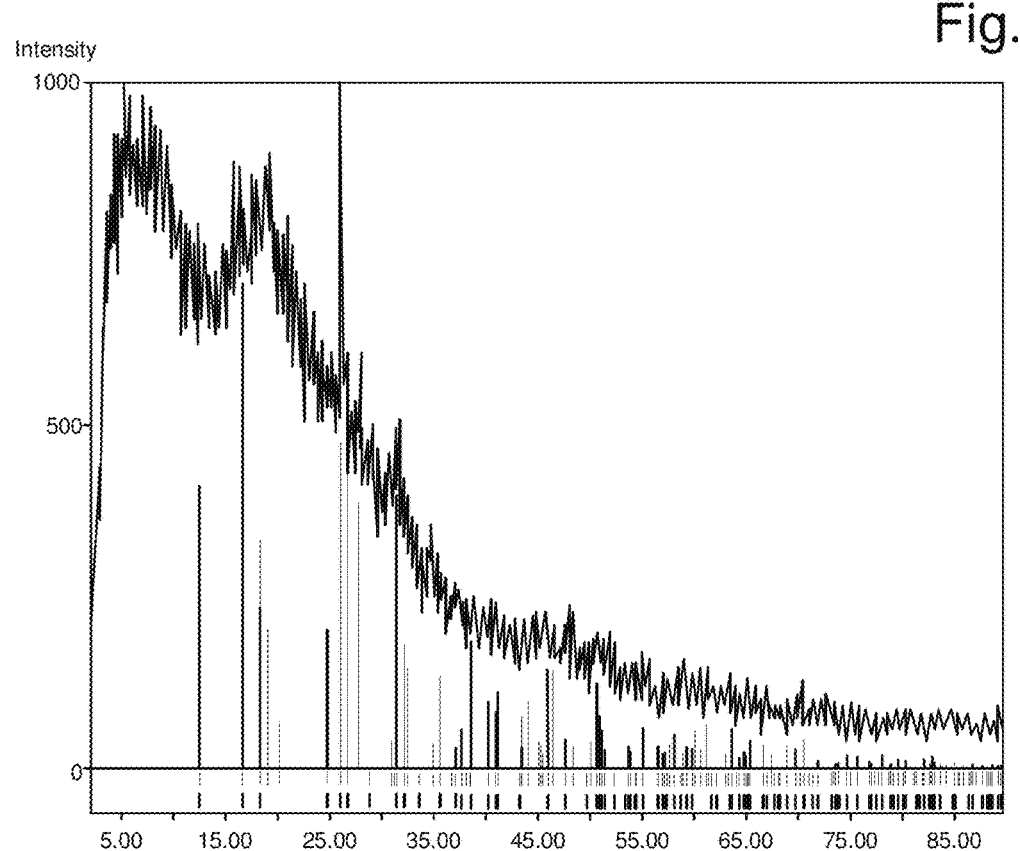
FIG. 12: X-Ray Powder Diffraction of LiV$_2$O$_5$ synthesized via ball milling compared to the theoretical pattern.
Figure 13:
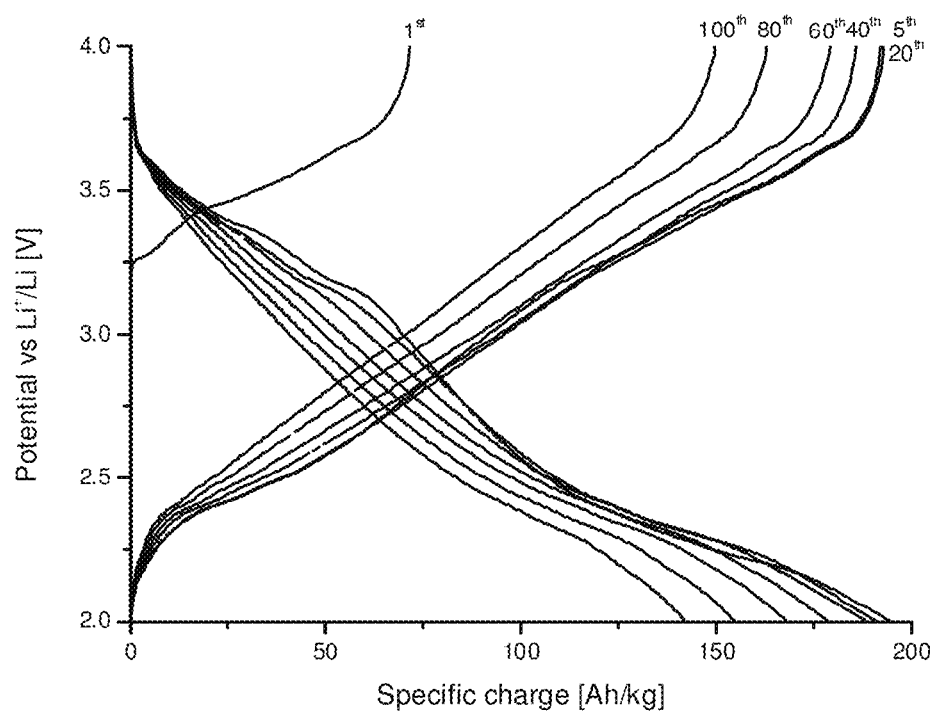
FIG. 13: Potential vs. specific charge for the via ball milling synthesized LiV$_2$O$_5$ electrode.

FIGS. 12 and 13:

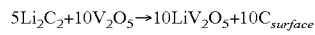

1.8 g (10 mmol) V$_2$O$_5$ and 0.1895 g (5 mmol) Li$_2$C$_2$ were premixed in a mortar. Then the mixture was reacted in a Fritsch Pulverisette 6 with 400 rpm for 0.5 hours.

EXAMPLE 5

Figure 14:
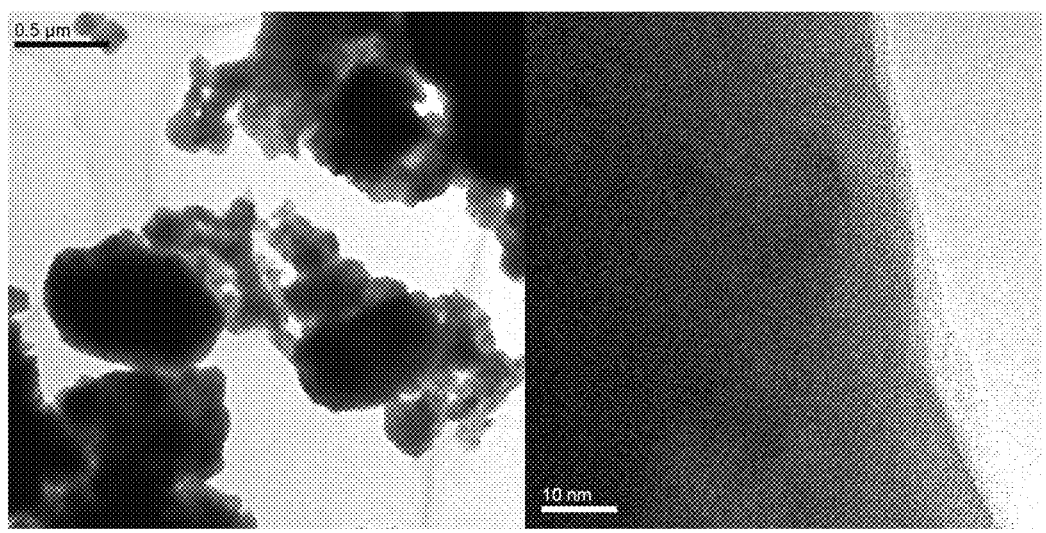
FIG. 14: TEM-bright field picture of Li$_{0.3}$MoO$_3$ with carbon coating
Figure 15:
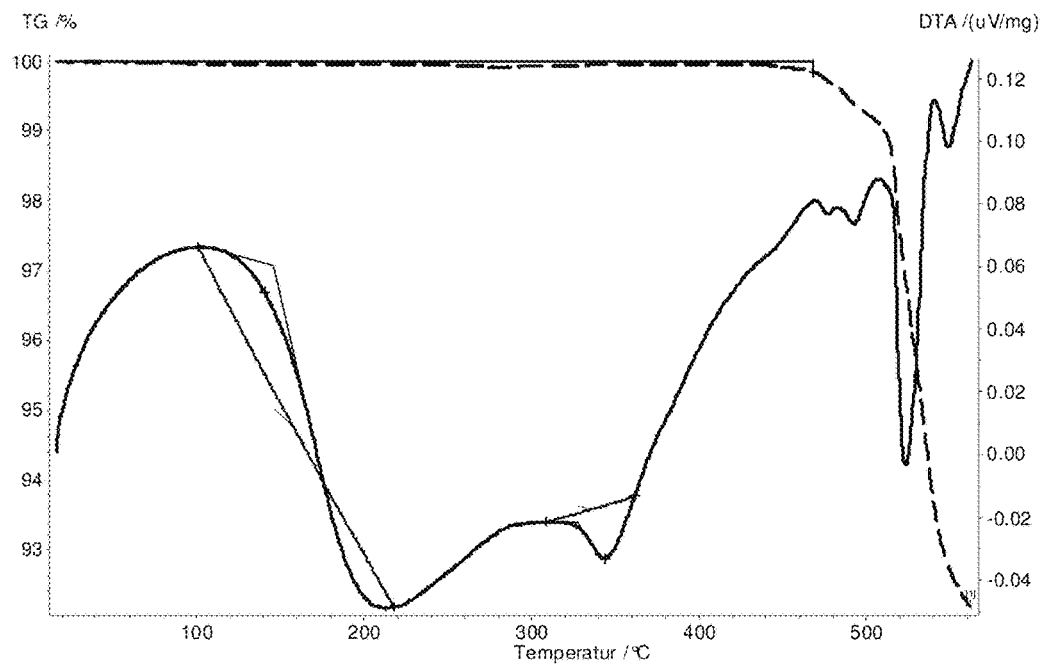
FIG. 15: Thermogravimetry of the reaction of Li$_2$C$_2$ with MoO$_3$ via ball milling.
Figure 16:
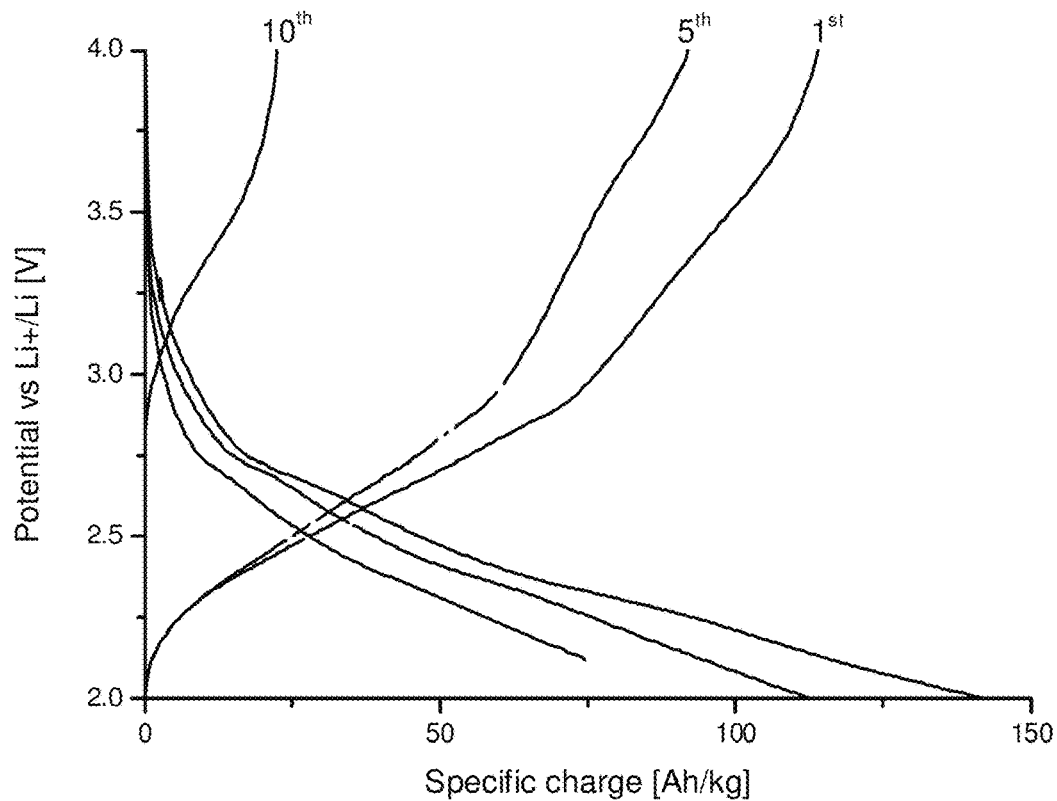
FIG. 16: Potential vs. specific charge for the via ball milling synthesized Li$_{0.3}$MoO$_3$ electrode.

FIGS. 14 to 16:

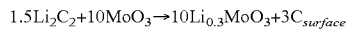

1.4394 g (10 mmol) $MoO_3$ and 0.0569 g (1.5 mmol) $Li_2C_2$ were premixed in a mortar. Then the mixture was reacted in a Fritsch Pulverisette 6 with 400 rpm for 0.5 hours.

EXAMPLE 6

Figure 17:
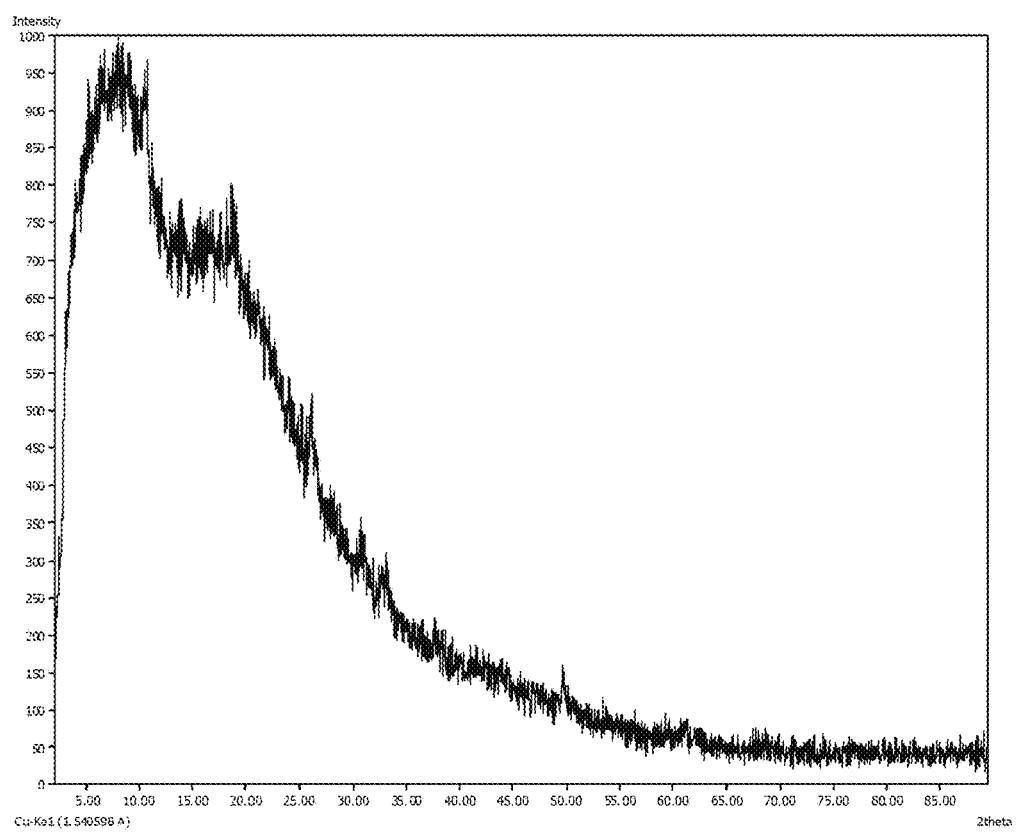
FIG. 17: X-Ray Powder Diffraction of LiH$_2$V$_3$O$_8$ synthesized via ball milling.
Figure 18:
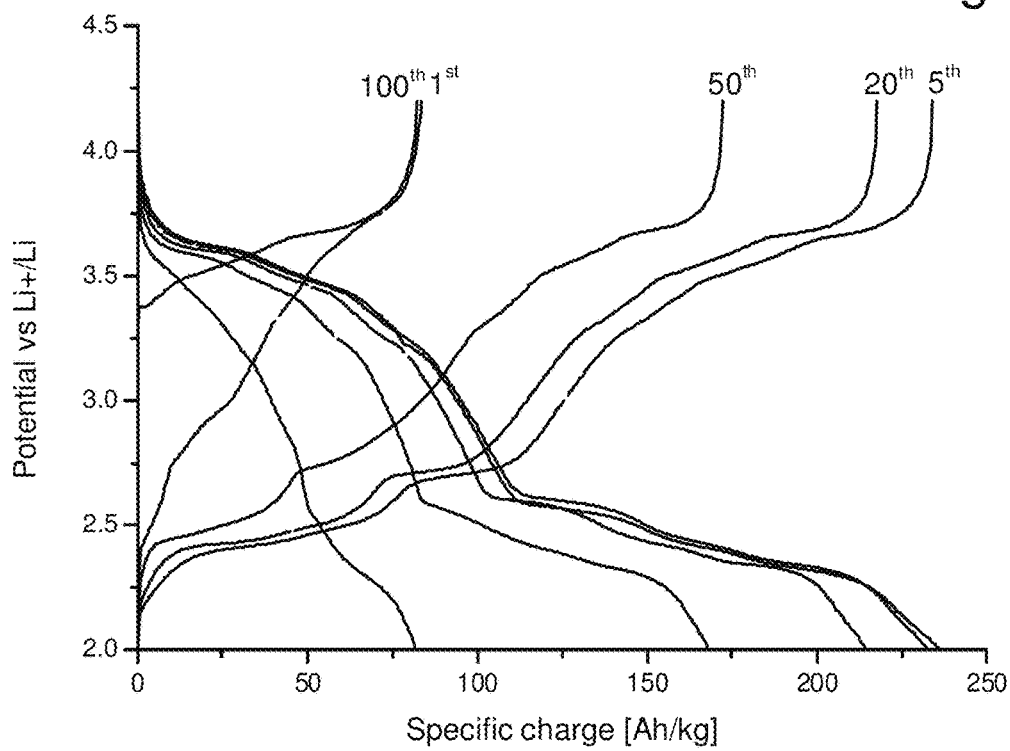
FIG. 18: Potential vs. specific charge for the via ball milling synthesized LiH$_2$V$_3$O$_8$ electrode.

FIGS. 17 and 18:

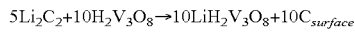

2.8284 g (10 mmol) $H_2V_3O_8$ and 0.1895 g (5 mmol) $Li_2C_2$ were premixed in a mortar. Then the mixture was reacted in a Fritsch Pulverisette 6 with 400 rpm for 0.5 hours.

EXAMPLE 7

Electrode Preparation

From the coated particulate materials described above electrodes were prepared by mixing 73% coated LiEAM 15% Super P® Carbon (obtainable from TIMCAL) and 2% polyvinylidene fluoride (PVDF) in a THF/Toluene 4:1 mixture and then drying at 180° C. under air, except for the $LiFePO_4$ electrode that was dried at 80° C. under vacuum.

Analytical data and electrochemical behaviour is shown in the Figures as indicated to each example.

While there are shown and described presently preferred embodiments of the invention, it is to be distinctly understood that the invention is not limited thereto but may be otherwise variously embodied and practiced within the scope of the following claims.

What is claimed is:

1. A coated at least partially metallated particulate electroactive material that is crystalline or amorphous, obtained by a process comprising:
   premixing an oxidant electroactive material with a metallated reductant, followed by
   chemically reacting the oxidant electroactive material with the metallated reductant,
   wherein:
   the metallated reductant is a coating precursor comprising an alkali metal or both an alkali metal and an alkaline earth metal,
   the chemically reacting is performed under a condition allowing reduction and metallation of the oxidant electroactive material via insertion or intercalation of the alkali metal and/or the alkaline earth metal and coating of the metallated electroactive material with a coating formed from the metallated reductant, and
   wherein the coating formed from the metallated reductant comprises at least one selected from the group consisting of:
   carbon nitride formed from $Li_2CN_2$;
   carbon boride formed from $Li_4BCB$;
   carbon boron nitride formed from a lithium pyrazine precursor;
   polymeric sulfur nitride formed from $Li_9NS_3$; and
   polyacetylene formed from $LiHC_2$.

2. An electrode comprising:
   the coated at least partially metallated particulate electroactive material of claim 1,
   a binder, which is optionally electronically conducting and is optionally in particulate form, and
   optionally a conductive additive.

3. A method for producing an electrode comprising the coated at least partially lithiated particulate electroactive material of claim 1, the method comprising mixing the coated particulate material with an optionally electronically conducting binder, optionally in particulate form and optionally in the presence of a conductive additive in an aprotic solvent followed by drying.

4. A battery comprising:
   an electrode of claim 2 as cathode,
   an anode, and
   an electrolyte.

5. The coated at least partially metallated particulate electroactive material of claim 1, wherein the condition comprises applying energy in at least one form selected from the group consisting of heat energy, tribological energy, ultrasonic energy, and microwave energy.

6. The coated at least partially metallated particulate electroactive material of claim 1, wherein the metallated reductant comprises an alkali metal comprising lithium and optionally sodium and/or potassium.

7. The coated at least partially metallated particulate electroactive material of claim 1, wherein the reductant of the metallated reductant is oxygen free.

8. The coated at least partially metallated particulate electroactive material of claim 1, wherein the oxidant of the oxidant electroactive material is selected from the group consisting of a transition metal oxide, a hydrated transition metal oxide, a transition metal oxynitride, a transition metal phosphate, a transition metal oxide glass, S, Se, and Si.

9. The coated at least partially metallated particulate electroactive material of claim 8, wherein the oxidant of the oxidant electroactive material is in the form of particles having an average particle size below 10 μm, and wherein the metallated reductant is in the form of particles with an average particle size of less than 10 μm.

10. The coated at least partially metallated particulate electroactive material of claim 1, wherein the coating has an average thickness of 0.5 nm to 30 nm.

11. The coated at least partially metallated particulate electroactive material of claim 1, wherein the condition allowing reduction and metallation of the oxidant electroactive material and coating deposition comprises applying tribological energy by ball milling at a rotation speed of 200 to 1500 rpm for 15 to 45 minutes, wherein a ratio between the weight of the balls and the weight of the sample is in the range from 6:1 to 4:1.

12. The coated at least partially metallated particulate electroactive material of claim 1, wherein the condition allowing reduction and metallation of the oxidant electroactive material and coating deposition comprises a heat treatment with a heating profile providing a slow heating rate of between 50 to 70 K/h for about at least the last hour before reaching the reaction temperature.

13. The coated at least partially metallated particulate electroactive material of claim 12, wherein the heating profile comprises a fast heating rate of 180 K/h-until about 60 K below the reaction temperature, followed by a slow heating rate of about 60 Kh.

14. The coated at least partially metallated particulate electroactive material of claim 1, wherein the coating formed from the metallated reductant comprises carbon nitride formed from $Li_2CN_2$.

15. The coated at least partially metallated particulate electroactive material of claim 1, wherein the coating formed from the metallated reductant comprises carbon boride formed from $Li_4BCB$.

16. The coated at least partially metallated particulate electroactive material of claim 1, wherein the coating formed from the metallated reductant comprises carbon boron nitride formed from a lithium pyrazine precursor.

17. The coated at least partially metallated particulate electroactive material of claim 1, wherein the coating formed from the metallated reductant comprises polymeric sulfur nitride formed from $Li_9NS_3$.

18. The coated at least partially metallated particulate electroactive material of claim 1, wherein the coating formed from the metallated reductant comprises polyacetylene formed from $LiHC_2$.

* * * * *